United States Patent [19]

Ginther

[11] 3,831,864

[45] Aug. 27, 1974

[54] APPARATUS FOR STORING AND DISPOSING OF GRASS CLIPPINGS

[76] Inventor: Albert W. Ginther, P.O. Box 311, Arcadia, Calif. 91006

[22] Filed: June 14, 1973

[21] Appl. No.: 369,895

[52] U.S. Cl. ............... 239/665, 239/685, 239/689, 56/1, 214/500
[51] Int. Cl. ......................................... A01c 17/00
[58] Field of Search .......... 239/650, 681, 683, 685, 239/689, 665, 666; 56/1; 214/500

[56] References Cited
FOREIGN PATENTS OR APPLICATIONS

| 10,418 | 1904 | Great Britain | 239/665 |
| 5,703 | 6/1932 | Australia | 239/650 |
| 861,529 | 2/1961 | Great Britain | 239/650 |
| 77,505 | 10/1950 | Norway | 239/685 |
| 471,199 | 7/1914 | France | 239/681 |
| 581,494 | 10/1946 | Great Britain | 239/660 |

*Primary Examiner*—Robert S. Ward, Jr.
*Attorney, Agent, or Firm*—Miketta, Glenny, Poms & Smith

[57] ABSTRACT

A grass clipping receptacle and disposal apparatus is provided in the form of a cart or small trailer to be towed behind a small motorized utility vehicle of the type used in the maintenance of golf courses, parks, cemeteries, etc. The apparatus includes an upstanding bin or hopper having an open top into which the clippings are dumped for temporary storage. A rotatable toothed drum is mounted within an open bottom of the hopper to dispense the clippings held therein at a uniform rate. A belt and pulley drive means is provided for rotating the drum in response to movement of the apparatus, and a manually operated clutch mechanism serves to selectively couple or decouple the belt drive so as to dispose the drum in either a rotating or non-rotating mode during vehicle travel. With this apparatus, clippings from a golf green for example may be temporarily stored in the hopper. Thereafter the clutch mechanism is engaged to cause the rotating drum to discharge the clippings during travel to the next green thus disposing of the cuttings by spreading them over the distance between each green. To insure uniform dispensing of the collected clippings, the rotatable drum is provided with a plurality of staggered teeth or pins which project radially outwardly from a cylindrical drum surface to engage and impel the clippings outwardly through the bottom of the hopper. An adjustable gate is provided on the hopper adjacent the rotating drum to selectively change the size of the opening through which the grass clippings are dispensed, such that the rate of discharge can be regulated.

6 Claims, 5 Drawing Figures

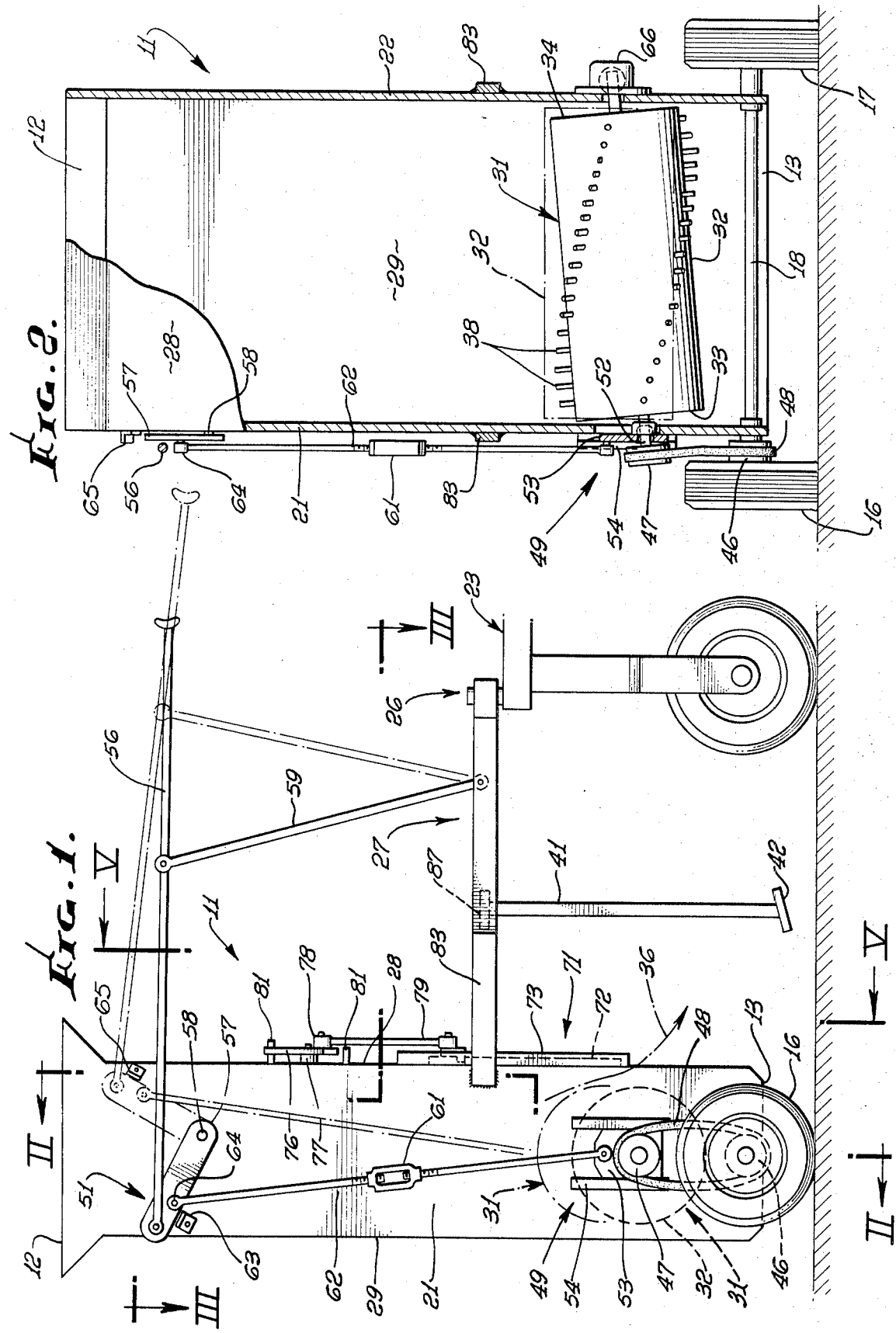

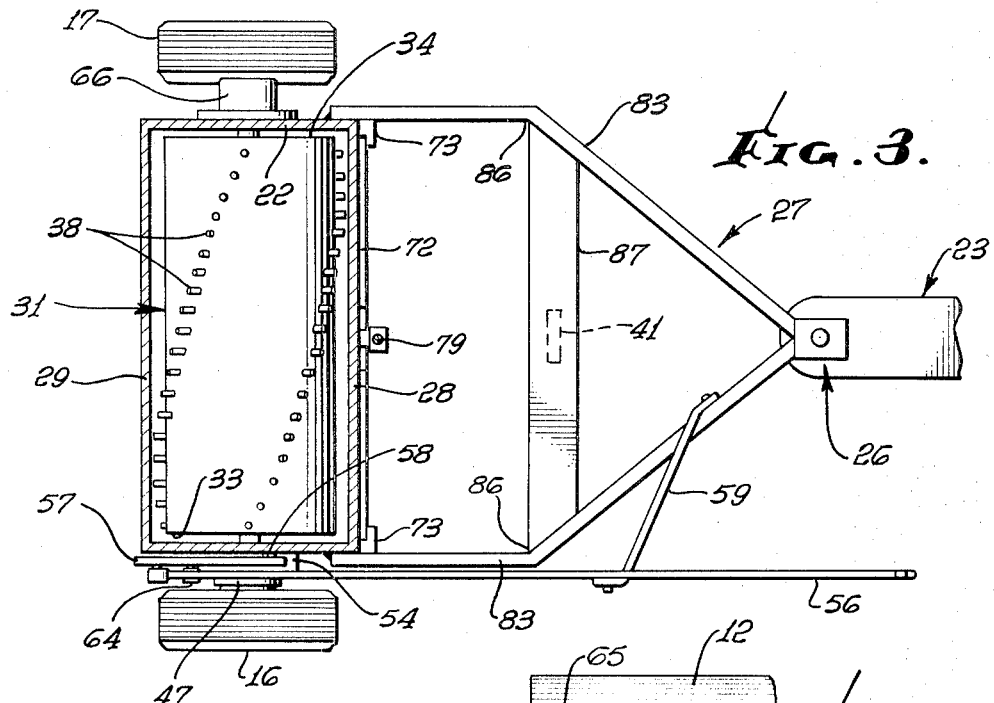
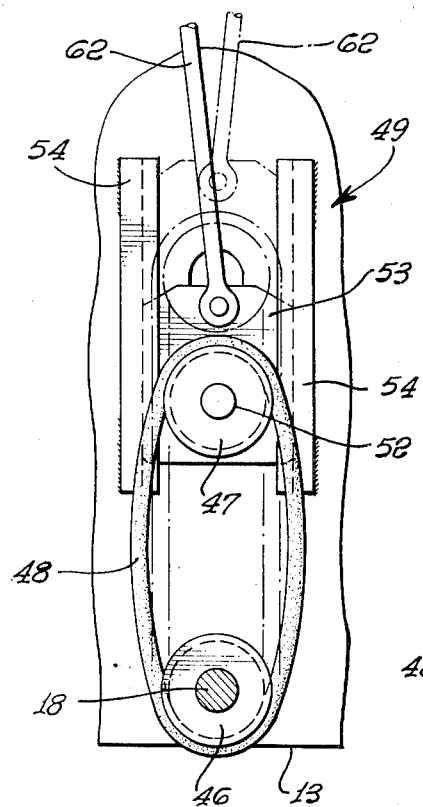
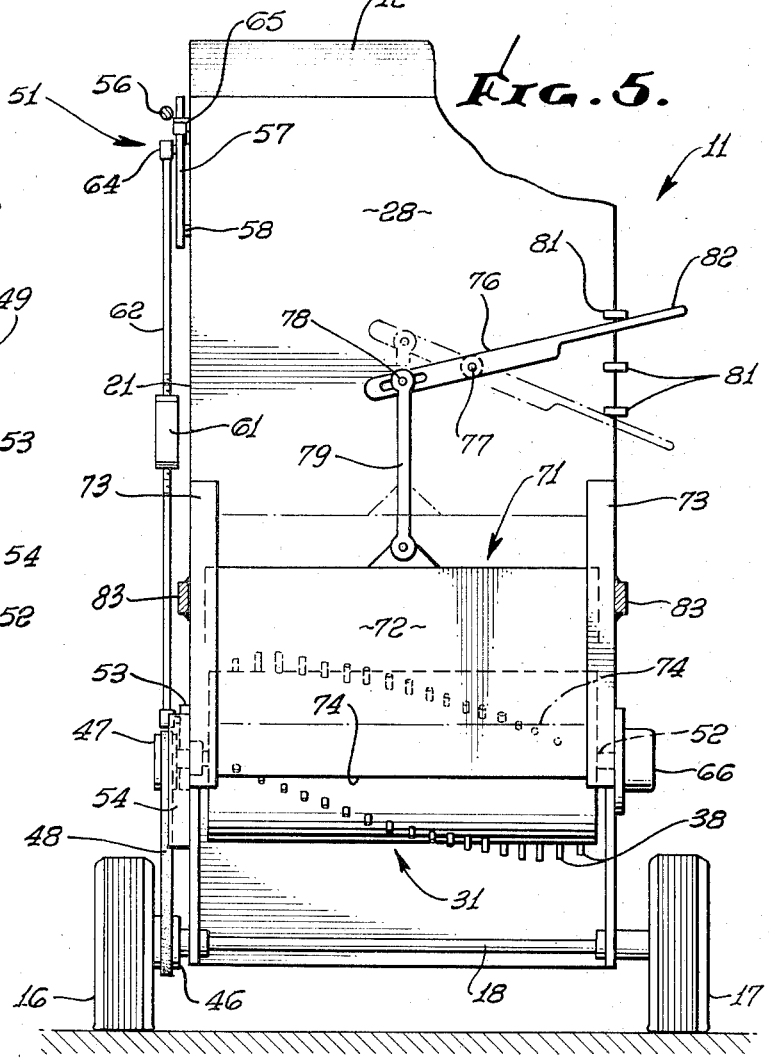

APPARATUS FOR STORING AND DISPOSING OF GRASS CLIPPINGS

BACKGROUND

In general, the present invention relates to method and apparatus for maintaining lawns, such as on a golf course, and more particularly to apparatus and method for handling and disposing of grass clippings collected from lawn cutting equipment.

In maintaining a golf course, and particularly the greens thereof, it is common practice to collect the daily grass clippings from the green and either deposit them in a pile near the green, or haul them off to a distant compost or disposal compound. If the clippings are merely left in a pile near the green, the wind may blow them back onto the green, or the sun may cause the pile to oxidize internally leaving an unsightly yellowed area on the grass beneath. On the other hand, the time and expense of carting the clippings from each green to a distant disposal area is undesirable.

In light of the foregoing, there exists a need of a more efficient and economical method of disposing of grass clippings, particularly daily clippings from the greens of a golf course. Briefly, this need is met by the apparatus and method of the present invention in which the clippings from a green or other freshly mowed area are collected and temporarily stored in a bin or hopper mounted on wheels such that it can be hauled at the rear of a motor driven vehicle. A small utility vehicles of the type commonly employed in the maintenance of parks, golf courses, cemeteries, etc., may be used for example.

To dispose of the clippings, the hopper is provided with a bottom opening in which a rotatable drum is mounted partially obstructing the opening and defining an outlet through which the clippings are uniformly dispensed from the hopper in response to rotating the drum. The rotatable drum is provided with a plurality of projections such as pins or bars radially extending from the cylindrical surface for facilitating the discharge of the clippings through the outlet.

Rotation of the drum is effected by a belt and pulley drive mechanism coupling the wheels of the hopper to a shaft upon which the drum is mounted for rotation such that the clippings are distributed only when the utility vehicle and wheel mounted hopper are in motion.

To control the discharge, a manually operated clutch mechanism is provided for selectively coupling or decoupling the belt drive to dispose the drum in either a rotating or non-rotating condition in response to movement of the apparatus. In the decoupled non-rotating condition of the drum, the grass clippings adhere to one another and to the insides of the hopper so that no discharge occurs. In this state, the clippings may be stored and transported to a point at which the disposal of the clippings can be initiated by operating the clutch mechanism to cause rotation of the drum.

Further in accordance with the present invention, the belt drive and manually operated clutch is provided by a rugged, trouble-free, simple to operate, and easily manufactured mechanism employing a slip belt feature. In this mechanism, one end of the drum is equipped with a pulley aligned with another pulley mounted to rotate with the ground wheels of the apparatus. A belt encircles these pulleys and is selectively tensioned or slackened by a manually operated off-set toggle which forces the drum axle and associated pulley toward or away from the wheel pulley.

As a further feature of the present invention, an adjustable gate is provided for regulating the rate of flow of clippings through the hopper outlet. This gate may be used to spread a thin or thick layer of clippings as desired, or to provide the same rate of discharge for wet clippings, which flow less readily, as for dry clippings.

These and further objects, features and advantages of the apparatus and method according to the present invention will become apparent to those skilled in the art from a consideration of the following detailed description of an exemplary embodiment of the invention.

BRIEF DESCRIPTION OF THE DRAWINGS

Reference will be made to the appended sheets of drawings in which:

FIG. 1 is an elevation view illustrating the apparatus in accordance with a preferred embodiment of the invention wherein the apparatus is here attached as a trailer to the rear of a small motorized utility vehicle.

FIG. 2 is a front sectional view of the hopper and rotatable drum components of the apparatus of FIG. 1 taken generally along section lines II—II therein.

FIG. 3 is a horizontal sectional view of the hopper of FIG. 1 taken generally along section lines III—III therein.

FIG. 4 is a detailed view of the slip-belt clutch and drive mechanism for selectively rotating the drum in response to movement of the hopper wheels.

FIG. 5 is a fragmentary view taken generally from V—V of FIG. 1 illustrating the adjustable gate for changing the rate of discharge of clippings from the hopper.

DESCRIPTION OF PREFERRED EMBODIMENT

With reference to FIG. 1, the apparatus constructed in accordance with one particular and preferred embodiment of the invention is shown to include a generally upstanding bin or hopper 11 formed with an upper, open and here outwardly flared end 12 for receiving grass clippings and a lower end 13 to which a pair of ground engaging wheels 16 and 17 are mounted for rotation. In this instance, wheels 16 and 17 are mounted on an axle 18 journaled for rotation at the lower end of a pair of side walls 21 and 22 of hopper 11. With hopper 11 mobilized in this manner, the apparatus may be attached to the rear end 23 of a vehicle, such as a small utility vehicle. A hitch means 26 may be provided for detachably connecting a tow bar assembly indicated generally at 27 to the rear of vehicle 23.

With reference to FIG. 3, the rectangular cross section provided in this instance for hopper 11 is defined by the pair of side walls 21 and 22, a front wall 28 and a rear wall 29. These walls define an open bottom to hopper 11 with side walls 21 and 22 extending below the front and rear walls to support axle 18. A rotatable drum or cylinder 31 is mounted generally within the otherwise open bottom of hopper 11 to substantially obstruct the opening and thus retain the grass clippings within the hopper. In particular, the exterior cylindrical surface 32 of drum 31 is disposed near, but slightly from, front and rear walls 28 and 29 of hopper 11 so as to provide some clearance therebetween. The axial ends 33 and 34 of the drum are in close proximity to the interior surfaces of side walls 21 and 22.

Rotation of drum 31 agitates the clippings stored in hopper 11 and impels them outwardly through the discharge opening defined by the interior wall surfaces of hopper 11 and the cylindrical surface 32 of the drum. For example, with reference to FIG. 1, the rotation of drum 31 is in this instance clock-wise such that the grass clippings tend to be forced outwardly in the direction of arrow 36 through the discharge or outlet opening defined by surface 32 of drum 31 and an interior surface 37 of front wall 28.

I have found that a rotating drum formed with a smooth, exterior cylindrical surface, may not be sufficient to uniformly force the clippings, especially if wet, out the discharge opening of the hopper. It is therefore preferable to provide some means on the surface of drum 31 for forcing the clippings to rotate with the drum and thereby be expelled through the discharge opening of the hopper. Such means may include spaced elements projecting radially outwardly and are here shown as including a plurality of projections 38 arranged in helically disposed sets on the drum 31. The projections may be in the form of pins as shown in FIGS. 2 and 3, or short bars similarly arranged, and they project no more than about 1 inch from the drum, and preferably one half inch or even less. They are advantageous in causing the desired discharge of clippings even when the grass is damp or wet, when the clippings tend to form clumps, which might cause uneven discharge from the hopper.

Discharge of the clippings occurs only when drum 31 is caused to rotate. When the drum is stationary, the natural adherence of clippings to one another and to the inside walls of hopper 11, prevents the grass from falling out the bottom open spaces adjacent drum 31. Thus, when the vehicle or apparatus is stationary, and drum 31 is in a non-rotating condition, clippings may be dumped into the open top of hopper 11 and stored therein until ready for disposal.

Disposal of the clippings is accomplished by providing means for causing drum 31 to rotate in response to movement, such as by towing, of the apparatus whereby the clippings are uniformly discharged over the travel path. Thus, hopper 11 may be used to collect and temporarily store clippings from a well kept lawn area and then towed over a less cultivated ground region or area onto which the clippings are spread in a sufficiently thin layer to cause scattering and thus disposal of the cut grass. This is particularly advantageous in the maintenance of golf course greens which are cut daily, and the clippings from wich can be scattered over the travel distance between each green.

For example, utility vehicle 23 may be of a type equipped with lawn cutting apparatus, such that upon reaching each golf course, the hopper apparatus 11 may be temporarily detached from the vehicle while the latter is used to cut the green. For this purpose, tow bar assembly 27 may be provided with a vertical stand support member 41 depending downwardly from transverse support 87 as best illustrated in FIG. 1. Upon decoupling hitch means 26, a lower pad 42 of member 41 rests upon the ground to provide together with wheels 16 and 17 a three point support for the grass storage and disposal apparatus.

After cutting the green and storing the clippings in hopper 11, hitch means 26 may be re-attached and the assembly driven to the next green. During each trip between greens, drum 31 is engaged for rotation in response to rotation of wheels 16 and 17 to cause the dispersal of the clippings.

For this purpose, drive means are provided for coupling rotation of the wheels to that of the drum axis, and manually operated clutch means is provided for selectively engaging and disengaging the drive means. In the presently disclosed embodiment, such means are shown in the form of a slip-belt drive and clutch mechanism including a wheel pulley 46 aligned with a drum pulley 47 mounted adjacent end 34 of drum 31, a flexible belt 48 encircling the pulleys, and a movable drum bearing mount assembly 49 operated by an off-set toggle mechanism 51. Pulley 46 is concentric with the axis of wheel 16 and is mounted to be rotated either individually by wheel 16, or jointly by wheel 16 and 17 via axle 18. Overlying and in substantial alignment with pulley 46, is a drum pulley 47 mounted at the end of a drum axle 52. Intermediate pulley 47 and an end 33 of the drum, axle 52 is journaled for rotation within a slider member 53 mounted for vertical reciprocation within a guide member 54. Members 53 and 54 together constitute the movable drum bearing mount assembly 49.

The end of axle 52 carrying pulley 47 is free to move with slider member 53 toward and away from wheel pulley 46 so as to selectively tension or slacken flexible belt 48. The position of axle 52 and drum 31 shown by solid lines in FIG. 2 illustrates the slackened condition, whereas the dotted line position illustrates the tensioned condition of the belt. When slackened, belt 48 does not transmit the rotational movement of pulley 46 to drum pulley 47, and thus the drive means is disengaged and hopper 11 may be towed without causing rotation of drum 31. Thus, in this condition, the drive means has been disengaged by the clutch means.

To engage the drive means and cause a responsive rotation of the drum upon movement of wheels 16 and 17, off-set toggle mechanism 51 is operated by manually displacing an elongate control rod 56 as best shown in FIG. 1. This control rod operates the off-set toggle to raise or lower slider member 53 and thus selectively slacken or tension the belt 48. In FIG. 1, the solid lines illustrate the slackened or disengaged condition of off-set toggle 51, whereas the dotted lines indicate the engaged condition of the drive and clutch means.

Mechanism 51 includes an arm 57 pivotally mounted at one end 58 for rotation between the solid line and dotted line positions. To cause this rotation, rod 56 is connected to the opposite end of arm 57 such that manual displacement of the rod toward and away from hopper 11 causes the desired arm rotation. Rod 56 is provided with a supporting strut 59 pivotally connected between rod 56 and tow bar assembly 27.

The pivotal mount at end 58 of arm 57 may be provided by a transverse pin joined to the exterior of side wall 21 of hopper 11. The connecting linkage between arm 57 and slider member 53 is provided by a rod assembly 62 having a lower end pivotally connected to an upper portion of member 53 and an upper end pivotally joined to arm 57 at 64, spaced from its pivotally mounted end 58. Means are provided for adjusting the effective length of rod assembly 62, here illustratively shown as a turnbuckle 61.

Accordingly, longitudinal movement of rod 56 causes arm 57 to rotate which in turn results in a vertical movement of rod assembly 62. In the solid line condition, rod 62 is in its lowermost position and slider 53 is caused to slide downwardly toward wheel 16 and thus to slacken the belt 48. Stop means may be provided to limit the lowermost position of slider 53, here shown as a bracket 63 mounted on the side wall of hopper 11 for limiting counterclockwise rotation of arm 57.

To hold off-set toggle mechanism 51 in the position shown by the dotted lines in FIG. 1, i.e., the position causing engagement of the drive mechanism, the operator pulls rod 56 forwardly, thus rotating arm 57 clockwise. This means that rod 62 has passed through its maximum vertical displacement and is moving downward again when arm 57 reaches the orientation shown by the dotted lines in FIG. 1, in abutment against stop bracket 65. In this latter condition, the tension force of belt 48 pulls downwardly on rod 62 and maintains arm 57 in the stable over center condition until forcefully displaced by manual movement of control rod 56.

The end of drum axle 52 opposite pulley 47 should be journaled so as to afford the slight tilting of the drum axis associated with the clutching mechanism. In particular, and with reference to FIG. 2, the presently disclosed embodiment provides a drum axle bearing 66 which permits the slight tilting between the solid and dotted line positions of drum 31. For example, bearing 66 may be provided with a swivel ball and socket bearing, or the like.

It has been found desirable to provide means for regulating the discharge of clippings from hopper 11 during vehicle travel. In the case of wet or damp grass cuttings, there is a tendency for the grass to cling to the inside of the hopper, rendering its discharge therefrom less effective. On the other hand, dry clippings may flow freely through the discharge outlet. To regulate the discharge flow under these diverse conditions and to afford control over the thickness of the deposited layer of clippings an adjustable discharge gate means 71 is provided for adjusting the size of the discharge opening. In particular, and with reference to FIGS. 1 and 5, gate means 71 may be provided by a rectangular front wall panel 72 mounted within lateral guides 73 for vertical movement between raised and lowered positions with respect to drum 31. In this instance, panel 72 forms an extension of front wall 28, such that the lower marginal edge 74 of the panel serves to define the discharge opening in conjunction with the cylindrical surface 32 of drum 31. Thus panel 72 may be placed in a lowermost condition, shown by solid lines in FIG. 5, to restrict the size of the discharge opening for the clippings, and raised to an uppermost position, shown by dotted lines in FIG. 5, to provide a large discharge opening. For heavy dscharge of dry grass, or regular discharge of wet or damp grass, gate means 71 may be adjusted to raise panel 72 to its highest position. Conversely, to limit the amount of discharge, that is to deposit a thin layer of clippings, panel 72 is put in its lowest position.

Adjusting of the height of gate means 71 is here accomplished by a lever arm 76 pivotally mounted at 77 to front wall 28 at a location generally over-lying panel 72.

One end 78 of lever arm 76 is connected to panel 72 by a downwardly depending link 79, such that rotation of arm 76 about pivot 77 causes a raising or lowering of panel 72. To set and maintain a particular panel height, a plurality of catches 81 are provided along a lateral edge of front wall 28 to locate arm 76 in a fixed position. Arm 76 may be removed from catches 81 by pulling a handle portion 82 outwardly from wall 28 and resetting the arm and panel position between another pair of catches 81.

Tow bar assembly 27 may be provided by any suitable construction. In the present embodiment, assembly 27 includes a pair of side extension members 83 which extend forwardly of front wall 28 and may be secured to hopper 11 such as by welding to side walls 21 and 22 as indicated at 84 of FIG. 1. Members 83 are bent inwardly at 86 to form a V-shaped configuration, terminating at an apex at which the hitch means 26 is mounted.

A cross support member 87 is fixedly joined to members 83 as indicated in FIG. 3, and an upper end of stand member 41 is secured to cross member 87.

While only one particular embodiment of the present invention has been disclosed herein, it will be readily apparent to persons skilled in the art that numerous changes and modifications may be made thereto without departing from the spirit of the invention. Accordingly, the foregoing disclosure and description thereof are for illustrative purposes only and do not in any way limit the invention which is defined only by the following claims.

I claim:

1. An apparatus for temporarily storing and subsequently disposing of grass clippings, comprising:
a generally upstanding hopper having an upper opening for receiving grass clippings therethrough and an open bottom;
a generally cylindrical drum mounted for rotation within said hopper in a position so as to substantially obstruct the otherwise open bottom and to define a discharge opening between the drum and an interior wall of said hopper;
means provided on said drum for agitating and impelling clippings within said hopper outwardly through said discharge opening;
wheels mounted on said hopper adjacent the lower end thereof to permit wheeling of said hopper over the ground;
drive means connected between said drum and said wheels for causing said drum to rotate in response to wheeled movement of said hopper and, comprising a belt drive including a drum pulley and a wheel pulley and a flexible belt encircling said pulleys;
manually operated clutch means for selectively engaging and disengaging said drive means between said drum and wheels so as to dispose said drum in either a rotating condition or a non-rotating condition in response to wheeled movement of said hopper, said clutch means comprising means for selectively tensioning and slackening said belt.

2. The apparatus of claim 1 further defined as follows:
a first end of said drum being rotatably mounted in a bearing affording limited tilting of the axis of rotation thereof and a second end of said drum being rotatably mounted in a movable drum bearing mount assembly affording movement of such drum end toward and away from the adjacent hopper wheel, said second end of said drum being provided with a pulley generally overlying the pulley associated with said wheel, and manually operated offset toggle means for selectively raising or lowering said movable drum bearing mount assembly to move said drum pulley and associated drum axis toward or away from said wheel pulley, whereby said belt encircling said pulleys is selectively tensioned or slackened to respectively engage or disengage the drive means to said drum.

3. The apparatus of claim 2, said movable drum bearing mount assembly comprising:
a slider member in which the axle of said drum at the second end thereof is journaled for rotation and a guide member, said slider member being movable in said guide member for reciprocation toward and away from said pulley mounted for rotation with said hopper wheel.

4. The apparatus in claim 3, said off-set toggle means comprising:
an arm having one end thereof pivotally connected to a wall of said hopper generally over-lying said movable drum bearing mount assembly,
a connecting rod extending between said slider member and a point on said arm off-set from the pivotal axis thereof, and
a control rod for selectively and forcefully rotating said arm between limit positions which cause said slider member to move to tension or slacken the belt encircling said pulleys.

5. The apparatus of claim 4 including stop means abuttable by said arm to establish said limit positions.

6. The apparatus of claim 5 including means for selectively adjusting the effective length of said connecting rod.

* * * * *